United States Patent [19]

Koltunov

[11] Patent Number: 5,895,568

[45] Date of Patent: *Apr. 20, 1999

[54] SUPERFINE OIL CLEANING FILTER

[75] Inventor: Anatoly Nikolaevich Koltunov, Poltava, Ukraine

[73] Assignee: Poltavskoe Chastnoe Nauchno-Tekhnicheskoe Predpriyatie, Poltava, Ukraine

[*] Notice: This patent issued on a continued prosecution application filed under 37 CFR 1.53(d), and is subject to the twenty year patent term provisions of 35 U.S.C. 154(a)(2).

[21] Appl. No.: 08/732,359

[22] PCT Filed: Feb. 22, 1995

[86] PCT No.: PCT/UA95/00001

§ 371 Date: Oct. 17, 1996

§ 102(e) Date: Oct. 17, 1996

[87] PCT Pub. No.: WO95/23913

PCT Pub. Date: Sep. 8, 1996

[30] Foreign Application Priority Data

Mar. 2, 1994 [UA] Ukraine .................................. 94032035

[51] Int. Cl.$^6$ ................................................ B01D 27/14
[52] U.S. Cl. ........................... 210/130; 210/136; 210/338; 210/342; 210/440

[58] Field of Search ...................... 210/130, 132, 210/136, 315, 337, 338, 342, 316, 335, 336, 440, 323.2, 430

[56] References Cited

U.S. PATENT DOCUMENTS 2,750,042  6/1956  Wilkinson .
4,950,400  8/1990  Girondi ................................. 210/342

FOREIGN PATENT DOCUMENTS 37 04 468  8/1988  Germany .
1457965   2/1965  U.S.S.R. ............................... 210/130
1023178   3/1966  United Kingdom ................... 210/132
1133859  11/1968  United Kingdom .

Primary Examiner—Matthew O. Savage
Attorney, Agent, or Firm—Collard & Roe, P.C.

[57] ABSTRACT

Proposed herein is a superfine oil cleaning filter, comprising a casing joined together with a cover, an antidrain valve, a filter element, a relief valve with a coarse-cleaning filter element, and a spring, the coarse-cleaning filter element being positioned upstream of the filter element and the relief valve in the space confined within the internal surface of the casing and the external surface of the filter element and of the filter cover. Depending on operating conditions the coarse-cleaning filter element either may be provided with a safety valve or be made up of two components one of which is positioned upstream of the filter element, and the other is located upstream of the relief valve.

2 Claims, 2 Drawing Sheets

SUPERFINE OIL CLEANING FILTER

TECHNICAL FIELD

The present invention relates to devices for filtering oils.

The herein-proposed superfine oil cleaning filter can find application in motor-vehicle, tractor, and aircraft internal combustion engines.

BACKGROUND ART

Oil filter 2101-1012005 available from the Automotive Units and Accessories Works in Livny, Russian Federation (LAAZ) is extensively known to comprise a casing and a cover held together, and a filter element enclosed in the casing and intended for both coarse and fine oil cleaning, provided with an antidrain and relief valves (cf. "Motor Vehicles "VAZ" by V. A. Vershigora et al., Moscow, Transport PH, 1974, pp.48, 49 (in Russian).

However, the filter mentioned above suffers from the constructional disadvantage that it fails to provide a quality oil cleaning.

During the cold start of an engine only that part of the filter element is involved in operation which effect coarse oil cleaning, since thickened oil fails to pass through the fine-cleaning part of the filter.

Once the engine has warmed up, the fine-cleaning part of the oil filter gets operative; however, coarse oil cleaning in the filter element does not cease, while the main flow of warmed-up oil keeps passing through the coarse-cleaning filter element and the fine-cleaning filter element remains inoperative.

Moreover, whenever the relief valve starts operating, the oil passing therethrough is not cleaned whatever.

Known in the prior art is a sectional-construction oil filter, comprising a casing and a cover joined together, said casing accommodating an antidrain valve and a fine oil cleaning filter element alone with a relief valve and a spring (SU, A, 1,358,985), and a similar but nonsectional filter 2105-1012005 available from LAAZ (cf. Motor Cars VAZ-2108 "Sputnik". Design. Repairs", Moscow, Transport PH, 1987, pp.11, 35 (in Russian).

When cold starting the engine equipped with the aforementioned oil filters, or in the case of a clogged filter element, uncleaned oil soiled with metal particles and carbon deposit is free to pass through the relief valve to get in the engine main manifold. This results, first and foremost, in abnormally rapid wear on the shells of the crankshaft main and crankpin bearings and on the engine piston group, and in that the engine lubricating system is not virtually protected against penetrating said oil contaminants thereinto.

Known in the art is also an oil filter by A. N. Koltunov (RU, A, 1,814,564) which is the closest to the filter proposed herein and comprises a casing joined together with a cover, an antidrain valve, a filter element, a relief valve with a coarse cleaning filter element, and a spring. However, use of such a filter construction under conditions of a heavily dust-laden or dirtied atmosphere, or use of poor-quality oil results in premature clogging of the filter element. The aforediscussed filter construction is adopted as the prototype.

DISCLOSURE OF THE INVENTION

The present invention has for its principal object to provide the construction of a superfine oil cleaning filter, wherein the service life of motor oil increases at least twofold, a reliable protection is offered against oil contaminants that are liable to arise during engine operation or may get from without, the motor service life and its operating reliability are increased, all these being attained due to a higher quality of oil cleaning.

The essence of the invention resides in that in a superfine oil cleaning filter, comprising a casing joined together with a cover, an antidrain valve, a filter element, a relief valve with a coarse-cleaning filter element, and a spring the coarse-cleaning filter element is positioned upstream of the filter element and the relief valve in the space confined within the internal surface of the casing and the external surface of the filter element and of the filter cover.

In one of its construction embodiments the superfine oil filter may be equipped with a safety valve located on the coarse-cleaning filter element.

The coarse-cleaning filter element of the present superfine oil filter may be composed of two components of which one is arranged upstream of the filter element, and the other, upstream of the relief valve.

The filter element of the present superfine oil filter may also have an additional element featuring a degree of oil cleaning up to 3 mcm.

The superfine oil cleaning filter, according to the present invention, is reliable in operation, prolongs the service life of any motor oil at least two times, and prevents any contaminants from getting onto the engine rubbing surfaces. Production costs for the superfine oil filter, according to the invention, are not virtually in excess of those for the presently known oil cleaning filters.

BRIEF DESCRIPTION OF THE DRAWINGS

In what follows the invention is illustrated by a detailed description of an exemplary embodiment thereof with reference to the accompanying drawings, wherein.

BEST MODE OF CARRYING OUT THE INVENTION

Figure 1:
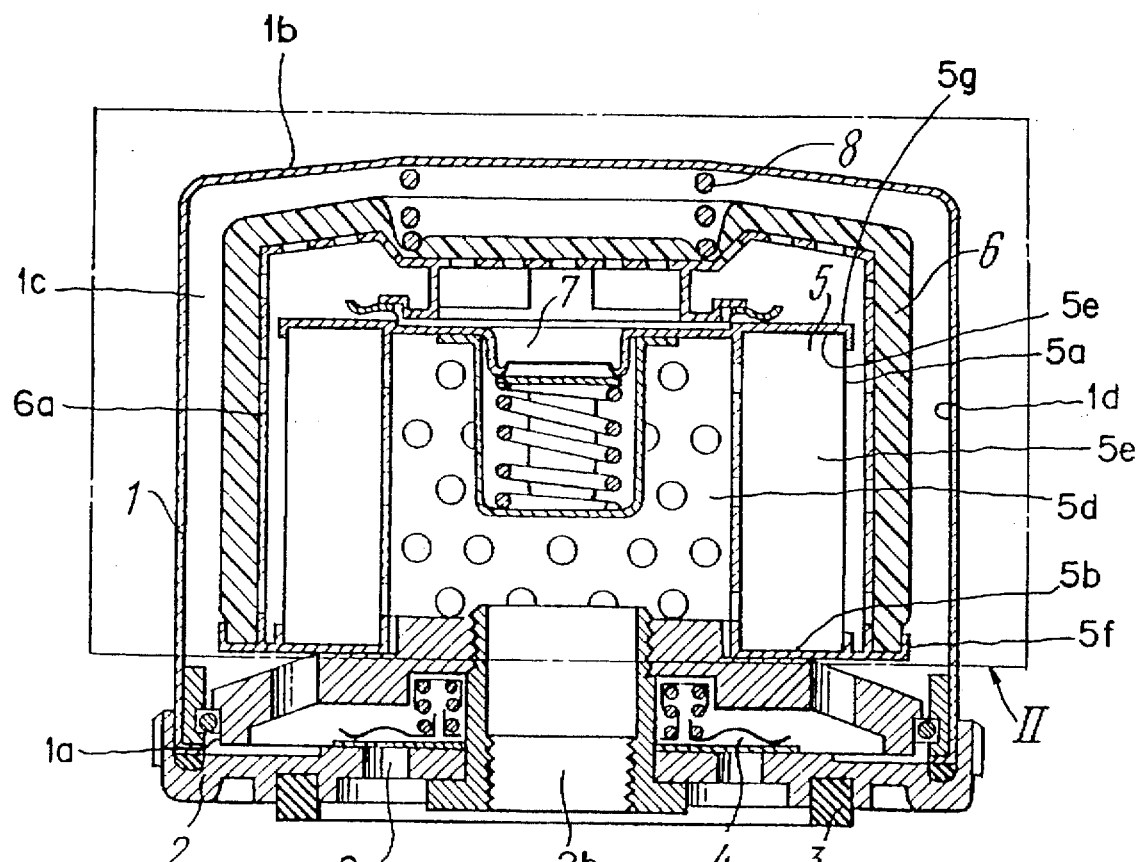
FIG.1 is a sectional view of a superfine oil cleaning filter, according to the invention.

The superfine oil cleaning filter comprises a casing 1 (FIG.1) joined together with a cover 2, a sealing gasket 3, an antidrain valve 4, a filter element 5, a coarse-cleaning filter element 6, a relief valve 7, and a spring 8.

The superfine oil filter is assembled as follows. The filter element 5 with the relief valve 7 and the coarse-cleaning filter element 6, as well as the spring 8 are installed in the casing 1. Then the cover 2 with the sealing gasket 3 is joined with the casing 1 by means of the antidrain valve 4.

Oil cleaning in the proposed superfine oil cleaning filter occurs as follows. When starting a cold engine oil from the oil pump is fed inside the filter casing 1 through the admission openings, having preliminarily forced out the antidrain valve 4.

Then oil passes through the coarse-cleaning filter element 6 to the filter element 5 and the relief valve 7. Since cold oil fails to pass through the filter element 5, it does pass through the relief valve 7 and further to the main engine manifold.

Once the engine has warmed up, the filter element 5 starts operating to clean the oil which passes also to the main engine manifold, whereas the relief valve 7 is closed.

As soon as the filter element 5 gets clogged, oil that has been cleaned in the coarse-cleaning filter element 6 beforehand, passes to the main manifold through the relief valve 7 which has been opened by virtue of a differential pressure.

The aforesaid variant of the technical solution (FIG.1) is most suitable for engines operating under conditions of superheavy dust loading (e.g., in agricultural work or work in deserts). As shown in FIG. 1, the casing 1 includes an open end 1a, a closed end 1b, an interior space 1c and an interior surface 1d. The cover 2 is joined together with the open end of the casing and defines an inlet port a and an outlet port b. The antidrain valve 4 is located on the cover for permitting unfiltered fluid to flow into the interior space through the inlet port but preventing flow out of the interior space through the inlet port. The first annular filter element 5 is accommodated in the interior space of the casing and includes a pervious peripheral exterior surface a and first and second ends b, c and a hollow interior d. The pervious peripheral exterior surface a is defined by a porous annular wall e having a first pore size. A first end cap f is provided for connecting the first end of the first annular filter element to the outlet port so that oil entering the casing through the inlet port can flow through the pervious peripheral exterior surface of the first annular filter element and flow to the outlet port via the hollow interior d and said first end cap f. A second end cap g is provided for closing the second end of the first annular filter element. The relief valve 7 is accommodated in the interior space of said casing and arranged on the second end cap. The relief valve opens when a pressure differential between the exterior surface a and the hollow interior d of the first filter element exceeds a predetermined value thereby permitting oil to flow through the second end cap directly to the outlet port. The cup-shaped coarse-cleaning filter element 6 is accommodated in the interior space of the casing and is interposed between the interior surface thereof and the exterior surface of the first filter element, and the cover. The coarse-cleaning filter element has a second pore size that is larger than the first pore size and encloses the pervious peripheral exterior surface of said annular first filter element and the second end cap including the relief valve therein. A support means 6a that is integral with the first and second end caps is provided for supporting an interior surface of the cup-shaped coarse-cleaning filter element in spaced apart relation from the first filter element and the interior surface of the casing. The coarse-cleaning filter element is located upstream of the first filter element and of the relief valve so that oil bypassing the pervious peripheral exterior surface of the first filter element via the relief valve is filtered by the coarse-cleaning filter element. A spring 8 abutting an exterior end surface of the coarse-cleaning filter element and the closed end of said casing is provided for biasing the coarse-cleaning filter element and the first annular filter element toward the cover 2.

Figure 2:
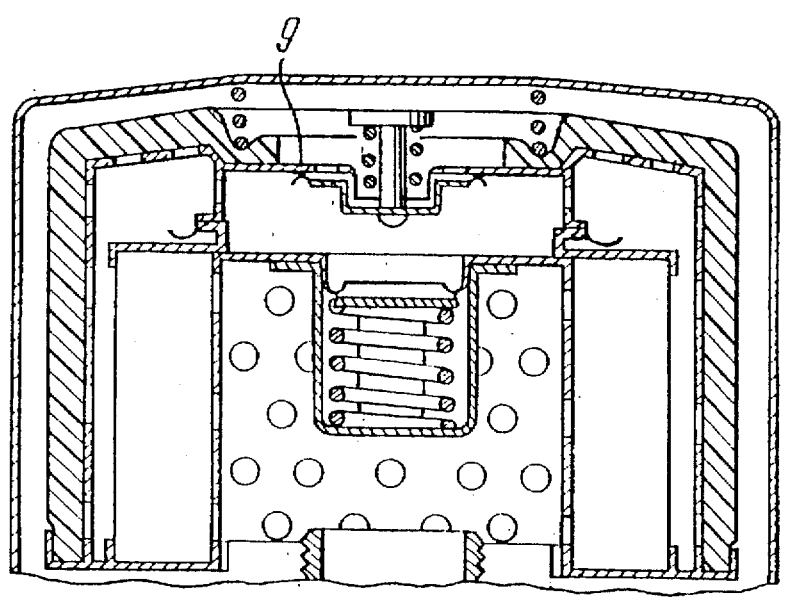
FIG.2 is a view of a superfine oil cleaning filter with a safety valve located on the coarse-cleaning filter element.

For engines operating under low temperatures (down to −30° C.) it is favorable to use the superfine oil filter of FIG.2 provided with a safety valve 9 located on the coarse-cleaning filter element 6.

Figure 3:
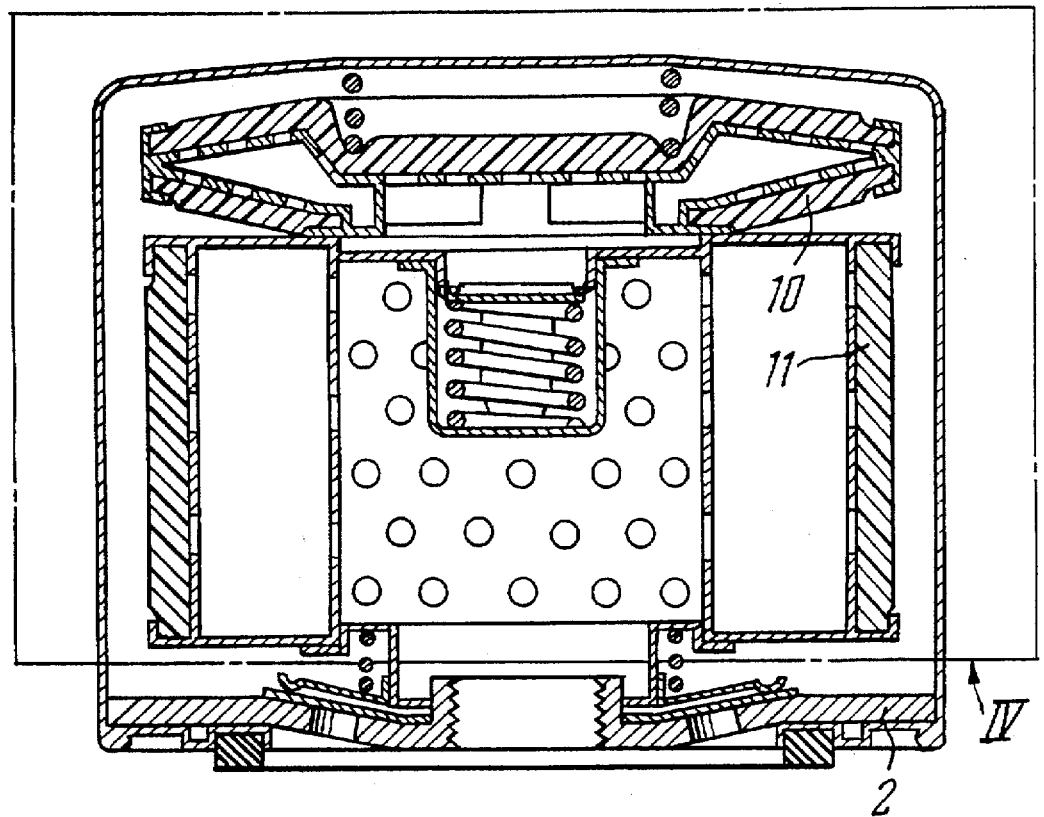
FIG.3 is a view of a superfine oil cleaning filter with a coarse-cleaning filter element made up of two components.

For engines operating under temperate climate conditions, the coarse-cleaning filter element of the superfine oil filter is composed of two components, i.e., 10 and 11 of which the component 10 is placed upstream of the filter element and the other component 11 is positioned upstream of the relief valve, whereby a higher quality oil cleaning is attained (FIG.3).

Figure 4:
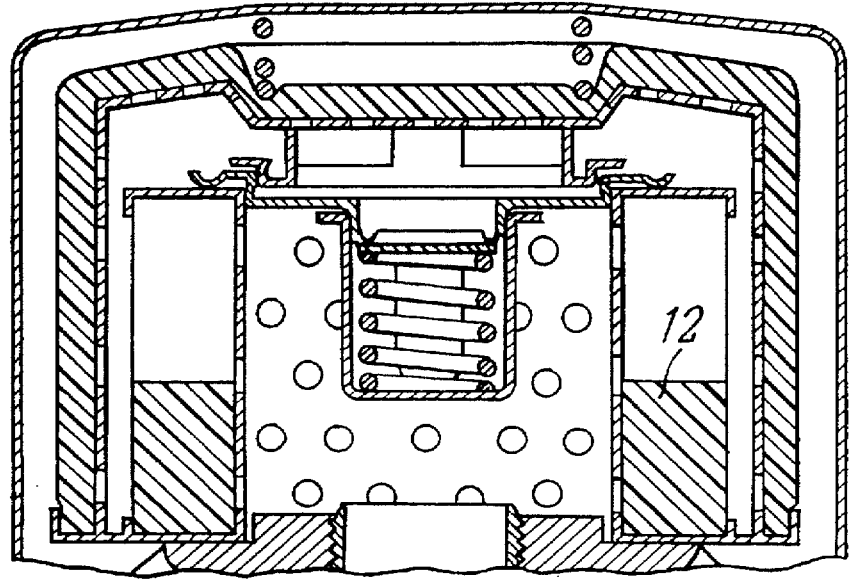
FIG.4 is a view of a superfine oil cleaning filter featuring a degree of oil cleaning up to 3 mcm.

The filter element 5 of the superfine oil filter intended for use in engines on which higher requirements are imposed, e.g., the engines of racing cars, may be equipped with an additional filter element 12 featuring the degree of cleaning up to 3 mcm (FIG.4).

As compared with the prototype, the proposed technical solution makes it possible, due to a combination of essential features, to provide an ecologically pure oil cleaning filter which protects reliably the engine against contaminants, improving the quality of oil cleaning, thus adds much to the engine service life and to its reliability, as well as increases the service life of oil at least twofold and that of the filter as a whole (save filter elements and a set of mechanical rubber goods) is extended twenty times which allows of saving an enormous amount of metal.

Industrial Applicability

The herein-proposed superfine oil cleaning filter can find application in engines of motor cars and is indispensable for motor vehicles operating in deserts, in agricultural work, etc.

Conventional traditional materials and equipment are used for manufacture of the herein-proposed superfine oil cleaning filter.

I claim:

1. An oil filter, comprising:

a casing having an open end, a closed end, an interior space and an interior surface;

a cover joined together with the open end of said casing and defining at least one inlet port and an outlet port;

an antidrain valve located on said cover for permitting unfiltered fluid to flow into said interior space through said inlet port but preventing flow out of said interior space through said inlet port;

a first annular filter element accommodated in said interior space of said casing including a pervious peripheral exterior surface and first and second ends and a hollow interior, wherein said pervious peripheral exterior surface is defined by a porous annular wall having a first pore size;

a first end cap for connecting the first end of said first annular filter element to said outlet port, whereby oil entering said casing through said inlet port can flow through the pervious peripheral exterior surface of the first annular filter element and flow to said outlet port via said hollow interior and said first end cap;

a second end cap for closing the second end of said first annular filter element;

a relief valve accommodated in said interior space of said casing and arranged on said second end cap, whereby said relief valve opens when a pressure differential between the exterior surface and the hollow interior of said first filter element exceeds a predetermined value thereby permitting oil to flow through said second end cap directly to said outlet port;

a cup-shaped coarse-cleaning filter element accommodated in said interior space of said casing and interposed between said interior surface thereof and the exterior surface of said first filter element, and said cover, wherein said coarse-cleaning filter element has a second pore size that is larger than said first pore size, and wherein said coarse-cleaning filter element encloses the pervious peripheral exterior surface of said annular first filter element and said second end cap including said relief valve therein;

support means integral with said first and second end caps for supporting an interior surface of said cup-shaped coarse-cleaning filter element in spaced apart relation from said first filter element and the interior surface of said casing;

wherein said coarse-cleaning filter element is located upstream of said first filter element and of said relief valve, whereby oil bypassing the pervious peripheral exterior surface of said first filter element via said relief valve is filtered by said coarse-cleaning filter element; and a spring abutting an exterior end surface of said coarse-cleaning filter element and the closed end of said casing for biasing said coarse-cleaning filter element and said first annular filter element toward said cover.

2. An oil filter as set forth in claim 1, wherein the first filter element is provided with an element having third pore size less than 3 µm for retaining particles sized 3 µm and greater.

* * * * *